(12) United States Patent
Shih et al.

(10) Patent No.: US 9,582,209 B2
(45) Date of Patent: Feb. 28, 2017

(54) EFFICIENT DATA DEPLOYMENT FOR A PARALLEL DATA PROCESSING SYSTEM

(71) Applicant: VMWARE, INC., Palo Alto, CA (US)

(72) Inventors: Chiao-Chuan Shih, Palo Alto, CA (US); Samdeep Nayak, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 113 days.

(21) Appl. No.: 14/748,262

(22) Filed: Jun. 24, 2015

(65) Prior Publication Data

US 2016/0378365 A1 Dec. 29, 2016

(51) Int. Cl.
G06F 3/06 (2006.01)

(52) U.S. Cl.
CPC ............ *G06F 3/0619* (2013.01); *G06F 3/065* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 5,724,349 A * | 3/1998 | Cloonan | ............. | H04L 12/1886 370/390 |
| 7,406,487 B1 * | 7/2008 | Gupta | ............... | G06F 17/30575 |
| 2006/0173851 A1 * | 8/2006 | Singh | ................... | G06F 21/6218 |
| 2008/0288811 A1 * | 11/2008 | Sudhakar | .......... | G06F 17/30067 714/4.11 |
| 2013/0227558 A1 * | 8/2013 | Du | ....................... | G06F 9/45558 718/1 |
| 2014/0122429 A1 * | 5/2014 | Chen | ................. | G06F 17/30174 707/623 |
| 2014/0149357 A1 * | 5/2014 | Gupta | ............... | G06F 17/30008 707/652 |
| 2014/0229440 A1 * | 8/2014 | Venkatesh | ......... | G06F 17/30174 707/634 |

* cited by examiner

*Primary Examiner* — Mano Padmanabhan
*Assistant Examiner* — Jean Edouard

(57) ABSTRACT

This document describes techniques for efficient data deployment for a parallel data processing system. In one embodiment, a virtualization platform running a parallel processing application that includes one or more virtual data nodes receives a first command to write a data block to a storage device. The platform then determines whether the first command was sent by a first virtual data node. If the first command was sent by a first virtual data node, the platform then 1) writes, the data block to a first location in the storage device; 2) returns the first location to the first virtual data node and 3) determines whether the data should be replicated. If the data should be replicated, the platform instructs the storage device to make a copy of the data block to a second location in the storage device and storing the second location in a tracking structure.

18 Claims, 3 Drawing Sheets

EFFICIENT DATA DEPLOYMENT FOR A PARALLEL DATA PROCESSING SYSTEM

BACKGROUND

Many parallel data processing systems, such as Hadoop, are architected using the master-worker design pattern and are comprised of name nodes and data nodes. In the master-worker design pattern, the name node assumes the role of master and coordinates all analytic processing sub-tasks among data nodes. A data node serves as a worker takes one sub-task and analyzes a subset of the data file. The results generated by each data node are combined through a series of steps to generate a final result.

Even though each data node will only typically process a subset of the data file, the complete data file is deployed to each of the data nodes to achieve redundancy, parallelism, and reliability. The process for deploying the data file starts by striping the data file into multiple chunks of data blocks. These data blocks are then transmitted from the data file source to the first data node which then stores them in its storage. The data is then propagated to the next peer data node which stores them in its storage. This process is repeated in a pipeline fashion until the data has been deployed to all data nodes.

Assuming that the data is deployed to N data nodes, the total cost of deploying the data is as follows. First, the first data node generates storage traffic by transfer data blocks from the data source. The first data node then generates storage traffic to transfer the data blocks through the storage fabric switches to the target storage device. The target storage device then writes the received data blocks to the storage. The storage device then sends a response back through storage fabric to the data node to indicate the status of the write. Finally, the first data node then generates network traffic by sending the data blocks to the next data node over the network. The process is repeated until the data has been deployed to N data nodes.

DETAILED DESCRIPTION

Figure 1:
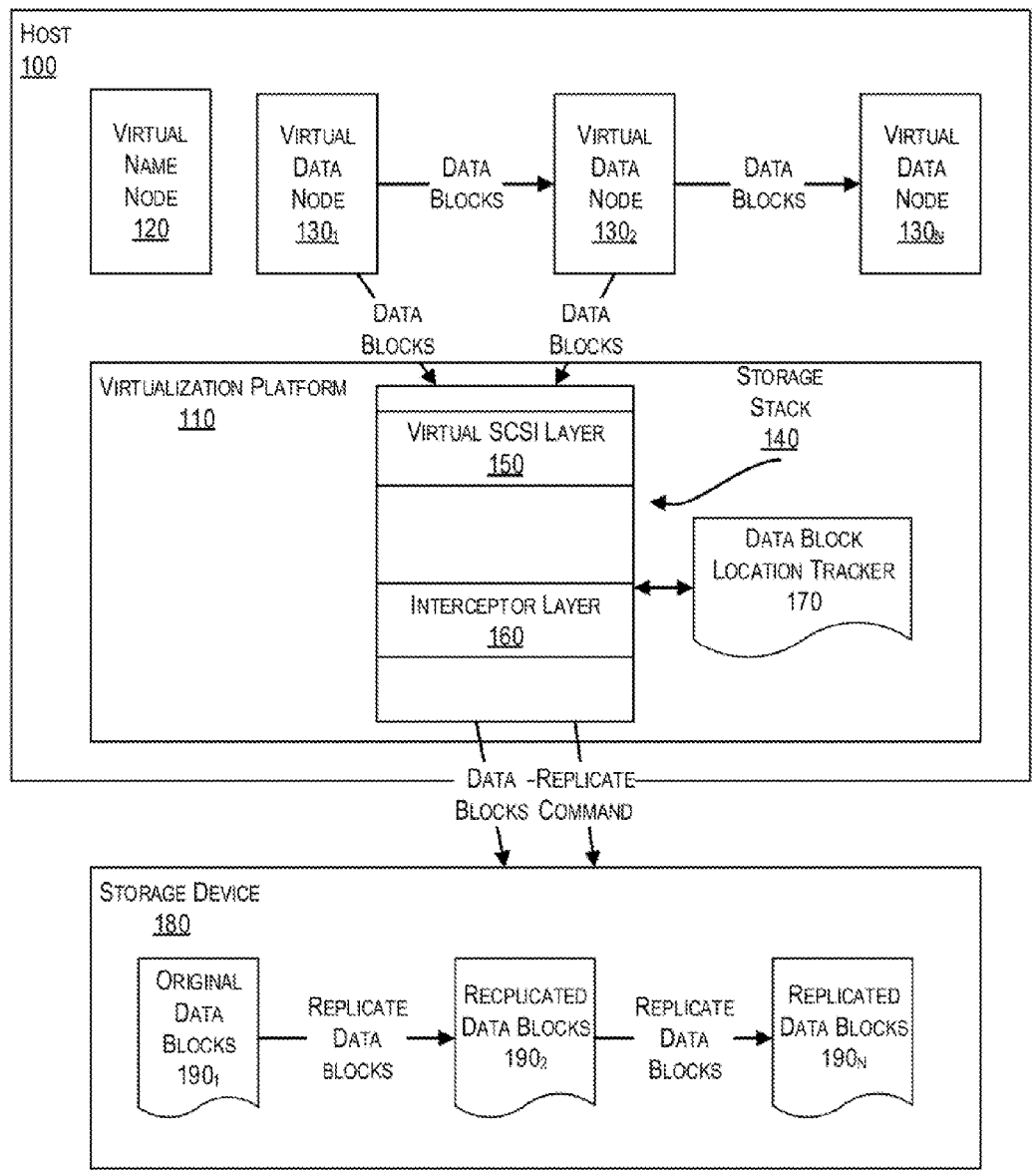
FIG. 1 depicts a system environment that supports efficient data deployment for a parallel data processing system.

In the following description, numerous examples and details are included to provide an understanding of the various embodiments of the invention. However, it will be evident to one skilled in the art that certain embodiments can be practiced without some of these details, or can be practiced with modifications or equivalents of the details.

1. Overview

This disclosure describes techniques that enable the efficient deployment of data by a parallel data processing system such as Hadoop. In one set of embodiments, the technique is initialized, when a virtual name node instructs a first virtual data node to deploy data blocks from a data source. The first virtual data node reads the data blocks from the data source and issues a storage command to the virtualization platform to write the data blocks to a storage device.

The virtualization platform may include a storage stack that may be comprised of many layers including a layer for receiving storage commands from virtual data nodes (as well as other types of nodes) and a layer for interacting with the storage device. For the purposes of this discussion, the layer that receives storage commands is called the virtual SCSI layer and the layer that interacts with the storage device is called the interceptor.

When the virtual SCSI layer intercepts the storage command, it inspects it for some indication that the storage command was issued by a parallel processing application. If the storage command was issued by a parallel processing application, it modifies the storage command to include an indication that the data blocks should be replicated by the storage device. The storage command is then propagated through the storage stack until it is received by the interceptor.

The interceptor writes the blocks to the storage device and returns the location of the written blocks back up the layers of the storage stack to the virtual data node. It then inspects the storage command for the indication that the data blocks should be replicated by the storage device. If the data blocks should be replicated, it instructs the storage device to internally replicate the data blocks and maintains a data structure that maps the locations of the replicated data blocks to virtual data nodes.

After the first virtual data node has written the data blocks to the storage device, it sends the blocks to a second virtual data node. The second virtual data node also issues a storage command to write the data blocks to a storage device to the virtualization platform which is intercepted by the virtual SCSI layer. As with the storage command issued from the first virtual data node, the virtual SCSI layer inspects the storage command for sonic indication that the storage command was issued by a parallel processing application. If the storage command was issued by a parallel processing application, it modifies the storage command to include an indication that the data blocks should be replicated by the storage device. The storage command is then propagated through the various layers of the storage stack to the interceptor.

The interceptor inspects the storage command for an indication that the data should be replicated. If it finds such an indication, it then updates the tracking structure so that second virtual data node is mapped to the locations of the copy of the data blocks. It then returns the locations of copy of the data blocks back up the storage stack to the second virtual data node without writing the blocks to the storage device. This process is repeated for all subsequent virtual data nodes that are a part of the parallel processing application.

With the techniques described in the previous paragraphs, a virtualization platform can deploy data for a parallel processing application to a storage device more efficiently. Replacing the need for each virtual data node to write data blocks to the storage array with a single storage command that instructs the storage device to internally replicate the data blocks makes the deployment of the data by the parallel processing application significantly more efficient by eliminating most of the storage traffic between the virtual data nodes and the storage device.

These and other aspects of the present disclosure are described in further detail in the following sections.

2. System Environment

FIG. 1 depicts a system environment that supports the efficient data deployment for a parallel data processing system. System environment includes host 100. Host 100 is a physical machine that may be a server computer, desktop computer or any other computing device capable of running a virtualization platform. Host 100 runs virtualization platform 110. Virtualization platform 110 may be any form of hypervisor based virtualization platform such as ESXi from VMware or any other equivalent hypervisor. In some embodiments, virtualization platform may be an operating system such as Linux that supports operating system level virtualization systems such as Docker or CoreOS.

Virtualization platform 110 provides an execution environment for a parallel data processing application. Parallel data processing applications may be any distributed computing system such as Hadoop. The parallel data processing application may be comprised of a virtual name node 120 and one or more virtual data nodes $130_1$ through $130_n$. The virtual name node 120 and data nodes $130_1$ through $130_n$ may be virtual machines or containers depending on the nature of virtualization platform 110.

Virtual name node 120 orchestrates a parallel data processing job by coordinating the efforts of virtual name nodes $130_1$ through $130_n$. When someone runs a parallel data processing job, virtual name node 120 starts the job by directing virtual data node $130_1$ to retrieve the data blocks that will be processed from a data source (not shown). Virtual data node $130_1$ then transmits the data blocks as a storage command to virtualization platform 110 to write the data blocks to storage devices 180. In some embodiments, virtual data node $130_1$ formats the storage command as a small computer system interface (SCSI) storage command.

In some embodiments, virtualization platform includes a storage stack 140 for processing storage commands. Storage stack 140 may include any number of modules for processing storage commands. In one embodiment, storage stack 140 includes virtual SCSI layer 150 and interceptor layer 160. When virtual data node $130_1$ transmits a storage command to virtualization platform 110, the storage command may be received by virtual SCSI layer 150. Virtual SCSI layer 150 inspects to storage command to determine whether it was generated by a parallel data processing application.

In some embodiments, virtual SCSI layer 150 inspects the storage command for a tau that indicates that the storage command was generated by a parallel data processing application. One method for including this tag in the storage command is described, by U.S. patent application Ser. Nos. 14/283,886 and 14/283,938 which are incorporated, in their entirety, into this patent application by reference. In this embodiment, the storage command may be a SCSI storage command.

Virtual SCSI layer 150 then propagates the storage command through any other layers to the interceptor layer 160. The interceptor layer 160 inspects the storage command for an indication that the data blocks should be replicated. In some embodiments, the storage command is a SCSI storage command and the indication that the data should be replicated is a tag embedded in the SCSI storage command. If the interceptor layer 160 should be replicated, the interceptor layer consults data block tracking structure 170 to determine if the data has already been replicated. Data block tracking structure 170 includes the locations on the storage device of data blocks and the data blocks replicas. These locations are mapped to the virtual data nodes. If the data has not been replicated, interceptor layer 160 writes the data blocks to storage device 180 as original data blocks $190_1$.

Storage device 180 may be a physical storage device such as, but not limited to, a SAN or a NAS that is communicatively connected to host 100. In some embodiments storage device is a virtual SAN that is comprised of a software layer implemented in virtualization platform 110 that presents multiple instances of locally attached storage as a single device. One implementation of a virtual SAN is VMware Virtual SAN.

Interceptor layer 160 then instructs storage device 180 to replicate original data blocks $190_1$ thus creating replicated data blocks $190_2$ to $190_N$ in a manner that is internal to storage device 180. In some embodiments, interceptor layer 160 instructs storage device 180 to replicate original data blocks $190_1$ by issuing a SCSI extended copy (XCOPY) storage command to storage device 180 where no actual data block transfer is needed between host and storage. In other embodiments, interceptor issues any other storage command that causes storage device 180 to internally replicate original data blocks $190_1$.

Interceptor layer 160 then tracks the locations of the replicated data blocks $190_2$ to $190_N$ in data block tracker 170. Data block tracker 170 may be a data structure that includes the locations of replicated data blocks $190_2$ to $190_N$. In some embodiments these locations are mapped to a virtual data node (e.g. the locations of replicated data blocks $190_2$ is mapped to virtual data node $130_2$, the locations of replicated data blocks $190_3$ is mapped to virtual data node $130_3$ and so on).

When virtual data node $130_2$ (or any other virtual data node) attempts to write the same data blocks as virtual data node $130_1$, interceptor layer 160 consults data block location tracker 170 to determine if the data blocks have already been replicated. If the data blocks have not been replicated then the process described in the previous paragraphs is used. However, if the data blocks have been replicated, interceptor fulfills the virtual data node $130_2$ write request by: 1) updating data block location tracker by mapping virtual data node $130_2$ to the locations of replicated data blocks $190_2$ (or any other unmapped copy of data blocks) and 2) returning the locations of replicated data blocks $190_2$ to virtual data node $130_2$.

In this manner, the data deployment by N virtual data nodes ($130_1$ to $130_N$) is more efficient because only the first request to write data blocks to storage device 180 by these nodes causes the data blocks to be transmitted over the communications channel connecting host 100 and storage device 180. By contrast, in a typical parallel processing system, where each node is a physical computer, these data blocks would be transmitted to a storage device for all N virtual data nodes. Moreover, because the virtualization platform 110 is managing this process, the efficiencies are gained without the need to modify the parallel processing system. From the perspective of the parallel data processing system, each virtual node has "written" data blocks to storage device when, in fact, virtualization platform 110 has written the data blocks to storage device 180 just once.

3. Data Deployment Workflow

Figure 2:
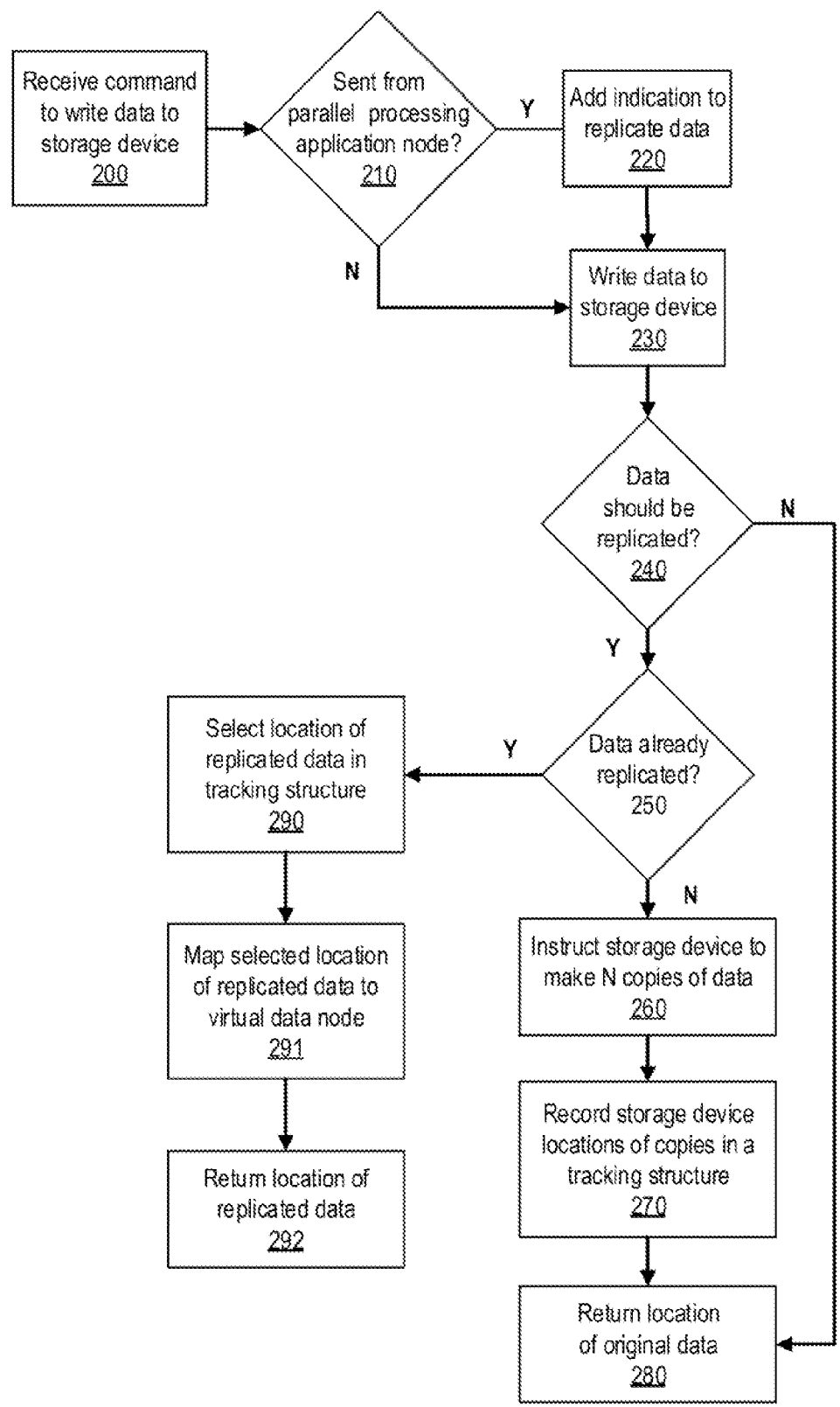
FIG. 2 is a flowchart depicting efficient data deployment for a parallel data processing system.

FIG. 2 depicts a workflow that may be executed in the context of system environment 100 of FIG. 1 to efficiently deploy data by a parallel data processing system.

At step 210, virtualization platform 110 receives a storage command to write data blocks to storage device 180. In some embodiments, the storage command is received and processed by a subsystem of the virtualization platform 110 called storage stack 140.

At step 210, virtualization platform 110 determines whether the storage command was sent from a parallel processing application. In some embodiments, the storage command is a SCSI storage command and the determination that storage command was sent from a parallel data processing application is made by virtual SCSI layer 150. In this embodiment, virtual SCSI layer 150 inspects the SCSI storage command structure for a tag that indicates that the data has been sent by a parallel data processing application. If the storage command was not sent by a parallel data processing application, the workflow skips to step 230.

If the storage command was sent by a parallel data processing application, then at step 220, virtualization platform 110 adds an indication to the storage command that the data blocks should be replicated by storage device 180. In some embodiments the indication is included by the virtual SCSI layer by adding another tag to the storage command that indicates that the data blocks should be replicated by storage device 180. In some embodiments, the tag in added to the SCSI storage command structure but any other well-known technique can be used to include an indication that the data blocks should be replicated. In this embodiment, virtual SCSI layer 150 then forwards the storage command through the storage stack 150 until it reaches interceptor layer 160.

At step 230, the virtualization platform 110 writes data blocks to the storage device 180 as original data blocks $190_1$. In some embodiments, interceptor layer 160 is the entity that writes the data blocks to storage device 180.

At step 240, virtualization platform 110 determines whether the data should be replicated by storage device 180, by looking for an indication that the data should be replicated. In some embodiments, this determination is made by interceptor layer 160. In this embodiment, interceptor layer 160 may make the determination by looking for an indication that the data blocks should be replicated. In other embodiments, interceptor layer 160 inspects the storage command to determine whether it includes a replication tag. If the data blocks should not be replicated the workflow skips to step 280.

If the data blocks should be replicated, then at step 250, virtualization platform 110 determines whether the data blocks have already been replicated by storage device 180. In some embodiments, virtualization platform 110 makes this determination, by looking for the locations of replicated blocks $190_2$ to $190_N$ in data block location tracker 170. If the locations are found, then the data has already been replicated and the workflow moved to step 290. In other embodiments, virtualization platform 110 may query storage device 180 to determine of the data blocks have been replicated. In some embodiments, step 250 is performed by interceptor layer 160.

If the data blocks have not already been replicated by storage device 260, virtualization platform 110 instructs storage device 180 to make copies of the data blocks. In some embodiments virtualization platform 110 performs step 260 by issuing an XCOPY to storage device 180. In some embodiments, interceptor layer 160 performs step 260.

At step 270, virtualization platform 110 receives the locations of replicated data blocks $190_2$ to $190_N$ from storage device 180 and records them in data block location tracker 170. In some embodiments, interceptor layer 160 performs step 270.

At step 280, virtualization platform 110 returns the location of the original data blocks $190_1$ to virtual data node $130_1$. In some embodiments step 280 is performed by virtual SCSI layer 150.

If the data was already replicated, at step 290, virtualization platform 110 selects the locations of one of the replicated blocks $190_2$ to $190_N$. In some embodiments, virtualization platform selects the locations based on whether the location of the replicated blocks are mapped, in data location tracker 170, to a virtual data node. In this embodiment, virtualization platform 110 selects an unmapped location. In some embodiments step 290 is performed by interceptor layer 160.

At step 291, virtualization platform 110 maps the selected location of replicated data to the virtual data node that issue the storage command. For example, if virtual data node $130_2$ issued the storage command and replicated data blocks $190_2$ were unmapped, then virtualization platform 110 will select replicated data blocks $190_2$ and map it to virtual data node $130_2$. In some embodiments this step is performed by interceptor layer 160.

Finally, at step 292, virtualization platform 110 returns the location of the replicated data blocks selected in step 290 to the virtual data node that issued the storage command. In some embodiments this step is performed by virtual layer 150.

4. Data Access Workflow

Figure 3:
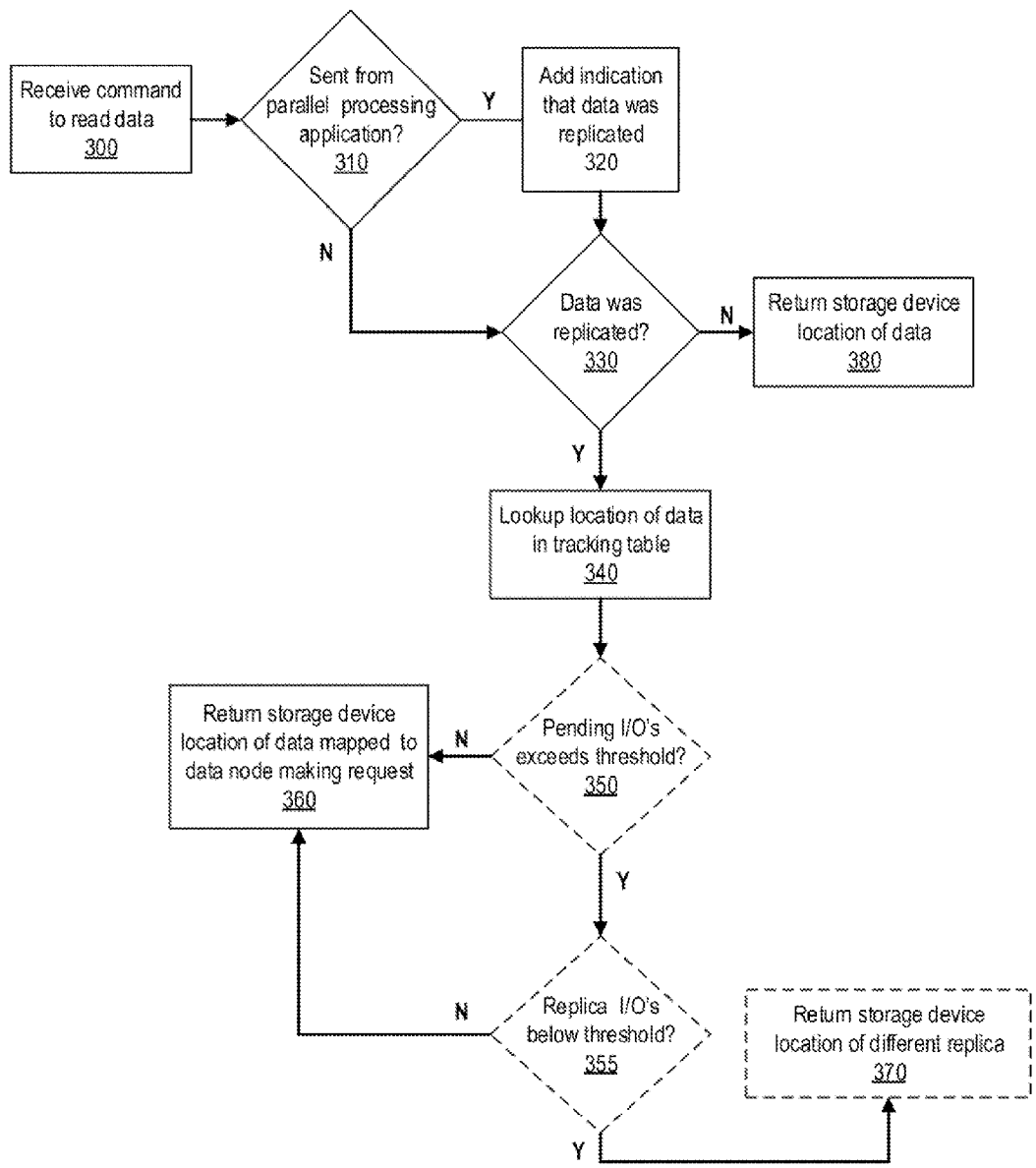
FIG. 3 is a flowchart depicting data access from data that has been efficiently deployed for a parallel data processing system.

FIG. 3 depicts a workflow that may be executed in the context of system environment 100 of FIG. 1 access data that was deployed by the workflow of FIG. 2. The workflow begins at step 300 when the virtualization platform 110 receives a storage command to read data from storage device 180. In some embodiments, this step may be performed by virtual SCSI layer 150.

At step 310, virtualization platform 110 determines if the storage command was sent from a parallel data processing application using techniques described in previous paragraphs. If the data was sent by a parallel data processing application, the workflow proceeds to step 320 else the workflow proceeds to step 330. In some embodiments, this step is performed by virtual SCSI layer 150.

At step 320, virtualization platform 110 adds an indication to the storage command that the data references by the storage command was replicated using techniques described in the previous paragraphs. In some embodiments, this step is performed by virtual SCSI layer 150.

At step 330, virtualization platform 110 determines if the data was replicated, using the same techniques as described in previous paragraphs. In some embodiments this step is performed by interceptor layer 160.

If the data was not replicated, then virtualization platform 110 returns the location, on the storage device, of the data being read. In some embodiments, this step is performed by virtual SCSI layer 150.

If the data was replicated, then virtualization platform 110 looks for an entry in data block location tracker 170 that maps the virtual node that issued the storage command to the locations of the replicated data blocks on the storage device. For example, if the virtual data node that issued the storage command was virtual data node $130_2$ then there may exist an entry in data block location tracker 170 that maps virtual data node $130_2$ to replicated data blocks $190_2$. In some embodiments this step is performed by interceptor layer 160.

In some embodiments, virtualization platform 110 performs optional step 350. In step 350, virtualization platform 110 determines of the number of pending I/O's for the data being requested in the storage command exceeds some threshold. For example the threshold may be 10 pending I/O's. If the storage command is the 11th read request for the data blocks, then the pending I/O's have now exceeded the threshold. In some embodiments the number pending I/O's for specific data blocks is determined by measuring the size queue depth of the storage device 180. For example, if the threshold is 10 pending I/O's and the storage device queue depth for the data blocks being requested is 11 then the pending I/O's have now exceeded the threshold. In some embodiments this step is performed by interceptor layer 160.

If virtualization platform 110 determines that the number of pending I/O's exceeds some threshold then, at step 355, rather than returning the location for data blocks that were mapped to the virtual data node that issued the read storage command, virtualization platform 110 determines if the number of I/O's for replicated data blocks mapped to another virtual data node exceeds some threshold.

For example, assume that virtual data node $130_2$ issued the read request and that the data blocks mapped to that node in data block location tracker 170 (e.g. data blocks $190_2$) are being accessed by 11 pending I/O's, thus exceeding the threshold of 10 pending I/O's. Virtualization platform 110 may determine that the pending I/O's for replicated data blocks $190_3$ are only being accessed by 5 pending I/O's. In that example, at step 370, virtualization platform would return the storage locations for replicated data blocks $190_3$, even though they are not mapped to virtual data node $130_2$, in data blocks location tracker 170. In some embodiments, steps 355 and 370 may be performed by interceptor layer 160.

At step 360, which follows step 340 or optionally step 355, virtualization layer returns storage devices location of the replicated data that is mapped, in data block location tracker 170, to the virtual data node that requested the data. For example, assume that virtual data node $130_2$ issued the read request and that the data blocks mapped to that node in data block location tracker 170 is the location for data blocks $190_2$. In this example, virtualization platform 110 would return the location for data blocks $190_2$.

The sequence diagrams of FIGS. 2 and 3 are illustrative and various modifications are possible. For example, although specific sequences of steps are shown, other sequences of steps may be performed in other embodiments. Further, steps described as sequential can be executed in parallel, order of steps can be varied, and steps may be modified, combined, added, or omitted. One of ordinary skill in the art will recognize many variations, modifications, and alternatives.

Certain embodiments described in this document can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for perforating the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by as computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the detailed description and throughout the claims that follow, "a," "an," and "the" includes plural references unless the context clearly dictates otherwise. Also, as used in the detailed description and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for deploying a data block comprising:
at a virtualization platform running a parallel processing application that includes one or more virtual data nodes:
receiving a first command to write a data block to a storage device;
determining whether the first command was sent by a first virtual data node; and
if the first command was sent by a first virtual data node:
writing the data block to a first location in the storage device,
returning the first location to the first virtual data node,
determining whether the data should be replicated, and
if the data should be replicated, instructing the storage device to internally make a copy of the data block to a second location in the storage device and storing the second location in a tracking structure.

2. The method of claim 1 wherein determining whether the first command was sent by a first virtual data node comprises inspecting the storage command for an indication that the data was sent by a virtual data node, and determining whether the data should be replicated comprises inspecting the storage command for an indication that the data should be replicated.

3. The method of claim 1 further comprising:
receiving a second command to write the data block to a storage device;
determining that the second command was sent by a second virtual data node; and
if the first command was sent by a first virtual data node:
determining that the data block was already replicated on the storage device, and
if the data block was already replicated, returning the location of the copy of the data block stored in the tracking structure to the second virtual data node without writing the data block to the storage device.

4. The method of claim 3 wherein determining whether the second command was sent by a second virtual data node comprises inspecting the storage command for an indication that the data was sent by a virtual data node, and determining whether the data should be replicated comprises inspecting the tracing structure for an entry that maps the second virtual data node to the location of the copy of the data block.

5. The method of claim 2 further comprising:
receiving a third command to read the data block from the storage device;
determining whether the number of pending I/O's requests for the data block exceeds a threshold; and
if the number of pending I/O requests exceeds some threshold:
determining that a copy of the data block exists where the number of pending I/O's for the data block is below the threshold, and
returning the location of the copy of the data block stored in the tracking structure.

6. The method of claim 5 wherein determining the number of pending I/O's for the data block comprises measuring the size of the I/O queue depth of storage device.

7. A computer system for deploying a data block comprising:
a processor;
a volatile memory;
a nonvolatile storage device; and
a non-transitory computer readable storage medium having stored thereon program code that, when executed by the processor, causes the processor to:
at a virtualization platform running a parallel processing application that includes one or more virtual data nodes:
receiving a first command to write a data block to a storage device;
determining whether the first command was sent by a first virtual data node; and
if the first command was sent by a first virtual data node:
writing the data block to a first location in the storage device,
returning the first location to the first virtual data node,
determining whether the data should be replicated, and
if the data should be replicated, instructing the storage device to internally make a copy of the data block to a second location in the storage device and storing the second location in a tracking structure.

8. The computer system of claim 7 wherein determining whether the first command was sent by a first virtual data node comprises inspecting the storage command for an indication that the data was sent by a virtual data node, and determining whether the data should be replicated, comprises inspecting the storage command for an indication that the data should be replicated.

9. The computer system of claim 7 further comprising:
receiving a second command to write the data block to a storage device;
determining that the second command was sent by a second virtual data node; and
if the first command was sent by a first virtual data node:
determining that the data block was already replicated on the storage device, and
if the data block was already replicated, returning the location of the copy of the data block stored in the tracking structure to the second virtual data node without writing the data block to the storage device.

10. The computer system of claim 9 wherein determining whether the second command was sent by a second virtual data node comprises inspecting the storage command for an indication that the data was sent by a virtual data node, and determining whether the data should be replicated comprises inspecting the tracing structure for an entry that maps the second virtual data node to the location of the copy of the data block.

11. The computer system of claim 8 further comprising:
receiving a third command to read the data block from the storage device;
determining whether the number of pending POs requests for the data block exceeds a threshold; and
if the number of pending I/O requests exceeds some threshold:
determining that a copy of the data block exists where the number of pending I/O's for the data block is below the threshold, and
returning the location of the copy of the data block stored in the tracking structure.

12. The computer system of claim 11 wherein determining the number of pending I/O's for the data block comprises measuring the size of the I/O queue depth of storage device.

13. A non-transitory computer readable storage medium having stored thereon program code executable by computer system, the program code embodying a method for deploying a data block comprising:
- at a virtualization platform running a parallel processing application that includes one or more virtual data nodes:
  - receiving a first command to write a data block to a storage device;
  - determining whether the first command was sent by a first virtual data node; and
  - if the first command was sent by a first virtual data node:
    - writing the data block to a first location in the storage device,
    - returning the first location to the first virtual data node,
    - determining whether the data should be replicated, and
    - if the data should be replicated, instructing the storage device to internally make a copy of the data block to a second location in the storage device and storing the second location in a tracking structure.

14. The non-transitory computer readable storage medium of claim 13 wherein determining whether the first command was sent by a first virtual data node comprises inspecting the storage command for an indication that the data was sent by a virtual data node, and determining whether the data should be replicated comprises inspecting the storage command for an indication that the data should be replicated.

15. The non-transitory computer readable storage medium of claim 13 further comprising:
- receiving a second command to write the data block to a storage device;
- determining that the second command was sent by a second virtual data node; and
- if the first command was sent by a first virtual data node:
  - determining that the data block was already replicated on the storage device, and
  - if the data block was already replicated, returning the location of the copy of the data block stored in the tracking structure to the second virtual data node without writing the data block to the storage device.

16. The non-transitory computer readable storage medium of claim 15 wherein determining whether the second command was sent by a second virtual data node comprises inspecting the storage command for an indication that the data was sent by a virtual data node, and determining whether the data should be replicated comprises inspecting the tracing structure for an entry that maps the second virtual data node to the location of the copy of the data block.

17. The non-transitory computer readable storage medium of claim 14 further comprising:
- receiving a third command to read the data block from the storage device;
- determining whether the number of pending I/O's requests for the data block exceeds a threshold; and
- if the number of pending I/O requests exceeds some threshold:
  - determining that a copy of the data block exists where the number of pending I/O's for the data block is below the threshold, and
  - returning the location of the copy of the data block stored in the tracking structure.

18. The non-transitory computer readable storage medium of claim 17 wherein determining the number of pending I/O's for the data block comprises measuring the size of the I/O queue depth of storage device.

* * * * *